(12) United States Patent
Baele et al.

(10) Patent No.: US 9,092,863 B2
(45) Date of Patent: Jul. 28, 2015

(54) STABILISATION METHOD AND COMPUTER SYSTEM

(75) Inventors: Xavier Baele, Brussels (BE); Julien Thollot, Woluwe-Saint-Lambert (BE)

(73) Assignee: SOFTKINETIC SOFTWARE, Brxelles (BE)

( * ) Notice: Subject to any disclaimer, the term of this patent is extended or adjusted under 35 U.S.C. 154(b) by 492 days.

(21) Appl. No.: 13/519,510

(22) PCT Filed: Dec. 28, 2010

(86) PCT No.: PCT/EP2010/070819
§ 371 (c)(1),
(2), (4) Date: Oct. 9, 2012

(87) PCT Pub. No.: WO2011/080281
PCT Pub. Date: Jul. 7, 2011

(65) Prior Publication Data
US 2013/0027293 A1    Jan. 31, 2013

(30) Foreign Application Priority Data
Dec. 28, 2009  (EP) ..................... 09180784

(51) Int. Cl.
| | |
|---|---|
| G09G 5/00 | (2006.01) |
| G06T 7/00 | (2006.01) |
| G06F 3/01 | (2006.01) |
| G06T 5/00 | (2006.01) |
| G06T 5/50 | (2006.01) |
| G06F 17/18 | (2006.01) |
| G06K 9/40 | (2006.01) |

(52) U.S. Cl.
CPC ............... *G06T 7/004* (2013.01); *G06F 3/011* (2013.01); *G06F 17/18* (2013.01); *G06T 5/002* (2013.01); *G06T 5/50* (2013.01); *A63F 2300/1093* (2013.01); *A63F 2300/6045* (2013.01); *G06K 9/40* (2013.01); *G06T 2200/24* (2013.01); *G06T 2207/10016* (2013.01); *G06T 2207/30196* (2013.01)

(58) Field of Classification Search
CPC ............... A63F 2300/1093; A63F 2300/6045; G06F 17/18; G06F 3/011; G06K 9/40; G06T 2200/24; G06T 2207/10016; G06T 2207/30196; G06T 5/002; G06T 5/50; G06T 7/004
USPC ............................. 348/208.4, 208.6; 345/156
See application file for complete search history.

(56) References Cited

U.S. PATENT DOCUMENTS

| | | | |
|---|---|---|---|
| 2002/0041327 A1 | 4/2002 | Hildreth et al. | |
| 2002/0131502 A1* | 9/2002 | Monro et al. | 375/240.16 |
| 2006/0061658 A1* | 3/2006 | Faulkner et al. | 348/207.1 |
| 2008/0030460 A1 | 2/2008 | Hildreth et al. | |
| 2008/0165280 A1 | 7/2008 | Deever et al. | |
| 2010/0265394 A1* | 10/2010 | Yamano et al. | 348/452 |

FOREIGN PATENT DOCUMENTS

| | | | |
|---|---|---|---|
| JP | 10013734 A | 1/1998 |
| JP | 10079872 A | 3/1998 |
| JP | 2000350056 A | 12/2000 |
| JP | 2005347821 A | 12/2005 |
| JP | 2006197455 A | 7/2006 |
| JP | 2006287632 A | 10/2006 |
| JP | 2010516101 A | 5/2010 |

* cited by examiner

OTHER PUBLICATIONS

International Search Report of PCT/EP2010/070819, dated Feb. 18, 2011.
Japanese Office Action dated Oct. 8, 2013, issued in Japanese Patent Application No. 2012-546439.

*Primary Examiner* — Quan-Zhen Wang
*Assistant Examiner* — Tony Davis
(74) *Attorney, Agent, or Firm* — Sughrue Mion, PLLC

(57) ABSTRACT

The present invention relates to a method for stabilizing a series of measurements of a physical variable captured by a digital sensor. This method comprises the steps of: capturing at least a first measurement, a second measurement, and a third measurement of said physical variable and storing each measurement in a digital memory. The first and second measurements are compared and, if a difference between the first measurement and the second measurement is below a predetermined threshold, the second measurement is replaced in the memory by a corrected second measurement where the difference with respect to said first measurement has been reduced using a first filtering strength. The corrected second measurement and the third measurement are compared and, if a difference between the filtered value of the corrected second measurement and said third measurement is also below the threshold, said the third measurement is replaced by a corrected third measurement where a difference with respect to said corrected second measurement has been reduced using a second filtering strength that is lower than the first filtering strength. This method has the advantage of filtering noise while still allowing slow but relevant variations in the series of measurements.

14 Claims, 3 Drawing Sheets

STABILISATION METHOD AND COMPUTER SYSTEM

CROSS REFERENCE TO RELATED APPLICATION

This application is a National Stage of International Application No. PCT/EP2010/070819 filed Dec. 28, 2010, claiming priority based on European Patent Application No. 09180784.2 filed Dec. 28, 2009, the contents of all of which are incorporated herein by reference in their entirety.

TECHNICAL FIELD

The present invention relates to methods and devices for stabilising a series of measurements of a physical variable captured by a digital sensor.

BACKGROUND OF THE INVENTION

While physical variables are usually continuous signals, digital sensors can only output discrete readings of those variables. The discrete readings of such a continuous physical variable by a digital sensor may generate some noise or modify the accuracy of the digital expression of the said continuous physical variable. While filters may be applied to reduce or suppress such noise, they may then also introduce perceptible latency/delay or mask slow, but definite, variations along the series of measures of said physical variable. It is thus advantageous to develop a stabilisation method which can suppress noise in the series of measures of a physical variable captured by a digital sensor without significantly affecting such slow, but definite variations, and without introducing an additional perceptible delay.

Such a stabilisation method is particularly advantageous for stabilising a series of spatial position measurements captured by a digital sensor over time, and in particular a series of spatial position measurements captured by a 3D digital imaging system over time. In particular when the capture of such a spatial position measurement also involves an object recognition step, the object recognition algorithm may induce significant noise in successive measurements of the spatial position of the object, noise which may be aggravated by the limited definition of the spatial positioning raster.

An attempt has been made in US Patent Application publication US 2006/028944 to suppress noise in a chronological series of position measurements captured by a digital motion sensor by discarding or attenuating a change in a position measurement if the difference with a previous position measurement is below a certain threshold. However, such a stabilisation technique could lead to a slow, but real continuous motion being unnoticed or reflected as a jerking variation in the position measurements. Apparently for this reason, according to this disclosure, this technique is only applied punctually in response to a particular event.

US 2008/165280 discloses a method of video stabilisation in which the stabilisation of an image is achieved using an initial set of image stabilisation parameters in the form of a stabilisation algorithm. Both causal and non-causal filtering is described where the decoded images are buffered when causal filtering is used. A comparison of partial projection vectors, partial areas of two images, is carried out to determine the best match (the minimum distance between the two vectors being compared) for a jitter component. A filter formula is used to compensate for jitter in two-dimensions, the filter formula being expressed in terms of the computed motion estimate. A damping factor, $\alpha$, is disclosed that steers the jitter towards zero and can be adapted from frame to frame to compensate for handshake of the video camera at frequencies $\geq 2$ Hz. The damping factor has a normalised value where $0 < \alpha < 1$.

US 2008/030460 discloses the comparison of a reference image to a comparison image to match features. Two threshold values are applied that effectively splits the image into three regions—a high damping region, a low damping region and a gradual or linear region. Positional information in the image is used to control the application, for example, the position of a hand within a region of interest.

SUMMARY OF THE INVENTION

Accordingly, the present invention comprises a method and a device which can reliably filter noise in a series of measurements of a physical variable captured by a digital sensor, while still satisfyingly reflecting slow but relevant variations in said physical variable along said series of measurements, while substantially preventing the introduction of a noticeable delay between the digital expression of the physical variable and its absolute expression in the real world continuous space.

According to the present invention, a method for stabilising a series of measurements P of a physical variable captured by a digital sensor comprises the steps of:

capturing, through said sensor, at least a first measurement $P_{t-2}$, a second measurement $P_{t-1}$, and a third measurement $P_t$ of said physical variable;

if a difference $\Delta_{t-1}$ between said first measurement $P_{t-2}$, and said second measurement $P_{t-1}$ is below a threshold $\beta$, replacing in a digital memory said second measurement $P_{t-1}$ with a corrected second measurement $P'_{t-1}$ in which a difference with respect to said first measurement $P_{t-2}$ is reduced using a filtering strength $\alpha_{t-1}$; and if a difference $\Delta_t$ between said corrected second measurement $P'_{t-1}$, and said third measurement $P_t$ is also below said threshold $\beta$, replacing in a digital memory said third measurement $P_t$ with a corrected third measurement $P'_t$ in which a difference with respect to said corrected second measurement $P'_{t-1}$ is reduced using a filtering strength $\alpha_t$ lower than the filtering strength $\alpha_{t-1}$ applied to the second measurement $P_{t-1}$.

By "digital memory" it is meant any computer-readable and computer-writeable data storage medium, including, but not restricted to, a solid state memory such as a random access memory or a flash memory, but also a magnetic data storage medium such as a hard disk drive or a magnetic tape, an optical data storage medium such as an optical disk, etc.

Because the filtering strength decreases for each subsequent measurement that has to be filtered, the filtered output will eventually converge towards an input that moves slowly but steadily in one direction. Short term noise, on the other hand, will be filtered at the highest filtering strength.

In the method described in US 2008/165280, there are no measured comparisons or correction of the measurements in accordance with a difference being below a threshold value. In this video stabilisation technique, stabilisation is achieved by keeping the same portion of the image in successive frames according to jitter and motion estimation. The original image is cropped (and therefore destroyed) and the cropped image is used for interpolation with the next image, the amount of cropping being determined in accordance with the determined jitter.

Whilst US 2008/030460 discloses the application of threshold values, these threshold values effectively split the image into three regions, namely, a high damping region, a low damping region and a gradual or linear region. Positional information in the image is used to control the application within a region of interest. In this method, no dynamic adjustment is provided as a linear function is used for damping between two threshold values.

Advantageously, in this method, $P'_{t-1}$ may be calculated, in a digital processor, according to the equation:

$$P'_{t-1} = P'_{t-2} + \Delta'_{t-1}\left(\frac{P_{t-1} - P_{t-2}}{\Delta_{t-1}}\right)$$

wherein $\Delta_{t-1}$ is the result of applying a filtering function $f(\Delta)$ to the difference $\Delta_{t-1}$ with filtering strength $\alpha_{t-1}$; and $P'_t$ may be calculated, in a digital processor, according to the equation:

$$P'_t = P'_{t-1} + \Delta'_t\left(\frac{P_t - P'_{t-1}}{\Delta_t}\right)$$

wherein $\Delta'_t$ is the result of applying the filtering function $f(\Delta)$ to the difference $\Delta_{t-1}$ with the lower filtering strength $\alpha_t$. Since these equations are applicable not just to scalar, but also to vectorial measurements P, the method according to this particular embodiment of the invention can also be used for stabilising series of measurements of a physical variable even when said physical variable is multidimensional.

Even more advantageously, the filtering function $f(\Delta)$ may be a power function following the equation:

$$f(\Delta) = \left(\frac{\Delta}{\beta}\right)^\alpha \cdot \beta$$

Advantageously, said first, second, and third measurements may be successive in time. The method according to this particular embodiment of the invention may thus be used to stabilise a series of chronologically successive measurements of a physical variable in order to evaluate the evolution of said physical variable over time.

Advantageously, said physical variable may be a position. Even more advantageously, said physical variable may be a position in a three-dimensional space. In a particular embodiment, a different set of filtering parameters may be applied for each axis in this three-dimensional space. Thus, especially when said measurements are chronologically successive, the method according to this particular embodiment of the invention may be used to filter noise in a motion captured using a digital position or motion sensor without significantly affecting the measurement of slow, but steady movements.

Particularly advantageously, said digital sensor may be an imaging sensor. This will further facilitate the capture of positional measurements, especially if said digital sensor is a 3D imaging sensor, allowing the capture of positional measurements in a three-dimensional space. Such 3D imaging sensors include, for instance, LIDAR sensors, Time-Of-Flight (TOF) cameras, cameras with scanning laser triangulation, or any other kind of teledetection system.

Particularly advantageously, capturing each measurement in said series of measurements of a physical position may comprise recognising a given object in an image and measuring its position in a reference frame. Existing recognition algorithms, such as, for instance, those previously disclosed in International Patent Application Publication WO 2008/128568, allow the recognition of an object, such as for instance a user's extremity, in an image, possibly a 3D image.

In WO 2008/128568, a method of recognising a volume within three-dimensional space is disclosed in which three-dimensional image data comprises a plurality of points with the three-dimensional space. These points are clustered and a cluster is selected as a point of interest. The points within the selected cluster are re-grouped into sub-clusters, each of which having a centroid and a volume associated with the centroid. Centroids can be connected to form a network indicative of an object and the extremities are identified as being a centroid that is connected to only one other centroid.

However, these algorithms may introduce a certain level of noise in the measurement of the position of said object in successive images. The method according to this particular embodiment of the invention provides a stabilisation of the successive positional measurements of said object against such noise without significantly affecting the transmission of slow but steady movements of the object, while avoiding the introduction of a noticeable delay between the real position and the digitised value of said position.

The method also relates to a computer-readable data storage medium storing executable code for performing this stabilisation method.

By "computer-readable data storage medium", it is meant any computer-readable support containing digital data, including, but not restricted to, a solid state memory such as a random access memory, a flash memory, or a read-only memory, but also a magnetic data storage medium such as a hard disk drive or a magnetic tape, an optical data storage medium such as an optical disk, etc.

The present invention also relates to a method for inputting data and/or commands to a computer system through a series of measurements of a physical variable captured by a digital sensor. In a particular embodiment of the invention, this series of measurements is stabilised as described above. Advantageously, said data and/or commands may relate to a computer game executed by said computer system. Said physical variable may be a physical position of a body part of a user.

The present invention also relates to a computer system. According to one preferred embodiment of the present invention, such a computer system comprises:

an input connectable to a digital sensor for receiving a series of measurements of a physical variable captured by said digital sensor;

a digital memory comprising instructions for executing a method for stabilising said series of measurements according to the invention; and a digital data processor connected to said digital memory and said input for executing said instructions.

BRIEF DESCRIPTION OF THE DRAWINGS

A particular embodiment of the invention will now be described in an illustrative, but not restrictive form, with reference to the following figures.

DETAILED DESCRIPTION OF THE INVENTION

Figure 1:
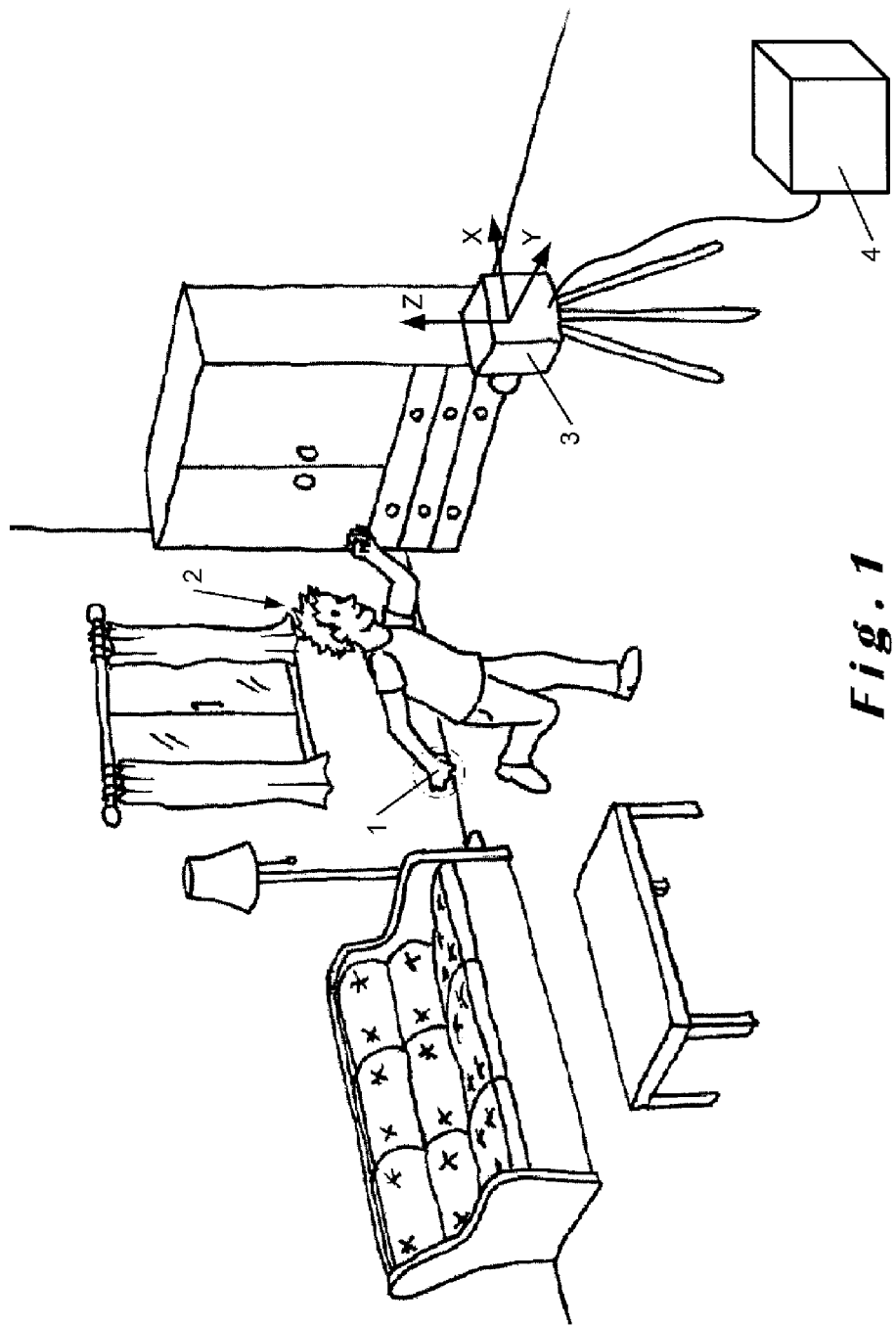
FIG. 1 shows a schematic view of a human user, a digital sensor, and a computer system according to a particular embodiment of the invention.

A specific embodiment of the invention is illustrated in FIG. 1. In this particular embodiment, the method of the invention is used to stabilise the motion of the right hand 1 of a human user 2 as perceived through a 3D imaging sensor 3 connected to a computer system 4. In a particularly advantageous embodiment, the 3D imaging sensor 3 is a TOF camera. However, other types of digital imaging systems, such as 2D cameras, stereo cameras, LIDAR, radar, sonar, etc. may alternatively be used.

The 3D imaging sensor 3 captures 3D image data of the room in which the human user 2 stands, comprising a 2D image of the room with a plurality of pixels and a depth value for each pixel corresponding the distance to the 3D imaging sensor 3 of the point imaged by that pixel. Since the X and Y positions of the pixels in the 2D image themselves correspond to zenith and azimuth angles of the points they represent with respect to the 3D imaging sensor 3, these 3D image data can be illustrated by a three-dimensional cloud of points corresponding to visible points of the objects in range of the 3D imaging sensor 3. For ease of processing, the depth and the zenith and azimuth angles of each point with respect to the 3D imaging sensor 3 can be converted into Cartesian coordinates.

A processor, which may be in the 3D imaging sensor 3 itself, in the computer system 4, or somewhere in-between, applies a recognition algorithm which groups the points of this image corresponding to the human user 2 into several clusters, each cluster corresponding to, and tagged as, a body part of the human user 2. The processor also calculates the position of the centroid of each cluster, and assigns it to the corresponding body part, such as the right hand 1. However, as the 3D imaging sensor 3 captures images of the human user which are successive in time, even minor changes in lighting may lead the recognition algorithm to assign different points to a given cluster, generating an apparent motion of the position of the corresponding body part, even if the human user 2 is in fact standing perfectly still. Such noise may be introduced by a lighting perturbation or modulation, by the limited definition of the 3D imaging sensor, and the raster of the reference frame on which the position of the body part is located, by the sensitivity of the 3D imaging sensor, and/or by previous image processing steps.

Figure 2:
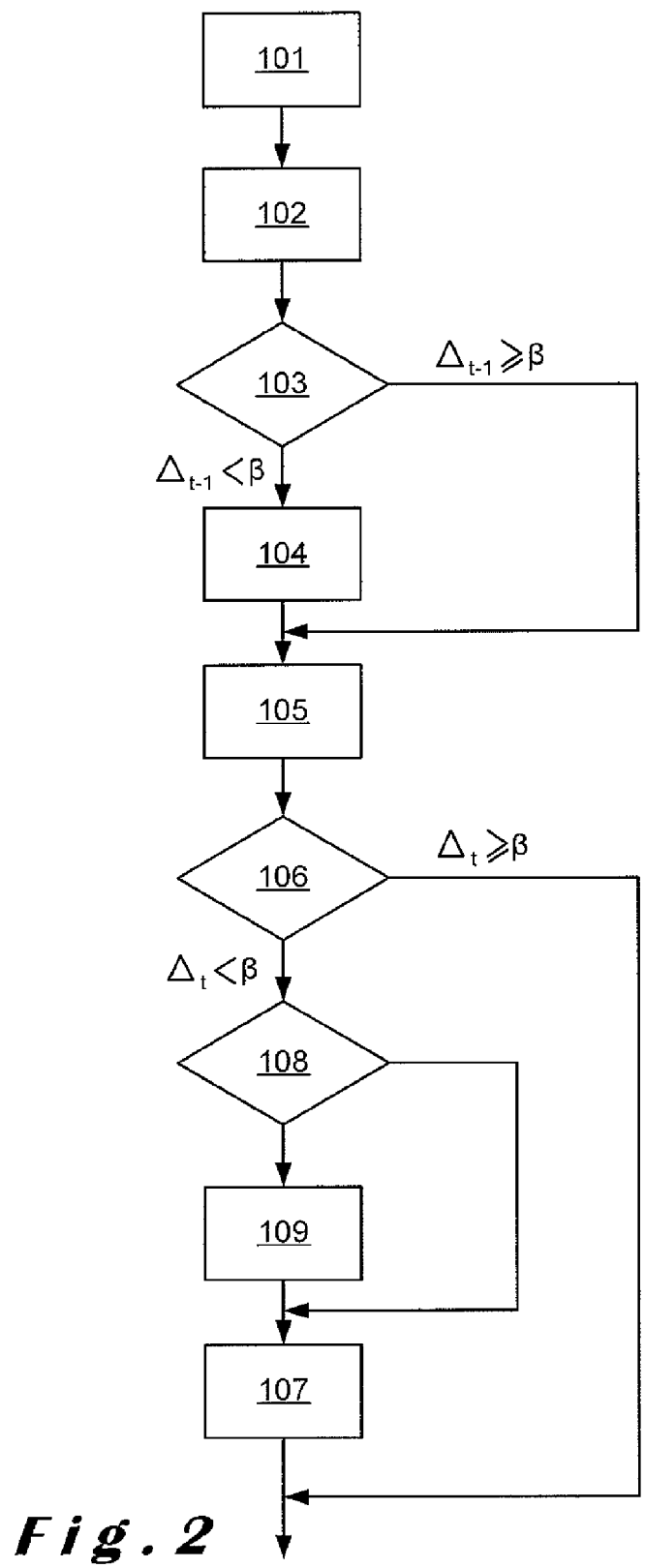
FIG. 2 shows a flowchart of a stabilisation method according to a particular embodiment of the invention.

In order to suppress this and other noise in the measured position of the hand 1, but not slow yet actual and steady motions of the same hand 1, the computer system 4 carries out a stabilisation method as illustrated in the flowchart of FIG. 2.

In a first step 101, the computer system 4 receives a chronologically successive series of measurements of the position of the hand 1 in the three axes X,Y,Z, as captured through the 3D imaging sensor 3 and interpreted by the abovementioned recognition algorithm, and comprising, for each one of the axes X,Y,Z, at least a first measurement $P_{t-2}$, a second measurement $P_{t-1}$, and a third measurement $P_t$ of the position of the hand.

In a second step 102, a processor in said computer system 4 calculates, for each one of the axes X,Y,Z, the difference $\Delta_{t-1}$ between said first measurement $P_{t-2}$ and said second measurement $P_{t-1}$ according to the equation:

$$\Delta_{t-1} = \|(P_{t-1} - P_{t-2})\|$$

In a third step 103, this difference, $\Delta_{t-1}$, is then compared to a predetermined threshold $\beta$ by the processor. In this preferred embodiment, this threshold $\beta$ may be individually set for each one of the axes X,Y,Z. If the difference $\Delta_{t-1}$ is higher or equal than the threshold $\beta$, the second measurement is left unfiltered. However, if the difference $\Delta_{t-1}$ is below said threshold $\beta$, the processor will calculate, in a fourth step 104, a corrected value $P'_{t-1}$ of the second measurement $P_{t-1}$ to replace said second measurement $P_{t-1}$ in a computer memory. This corrected value $P'_{t-1}$ is calculated according to the equation:

$$P'_{t-1} = P_{t-2} + \Delta'_{t-1}\left(\frac{P_{t-1} - P_{t-2}}{\Delta_{t-1}}\right)$$

wherein $\Delta'_{t-1}$ is a corrected difference resulting from applying a filtering function $f(\Delta)$ to the difference $\Delta_{t-1}$ with a filtering strength $\alpha_{t-1}$, the filtering function $f(\Delta)$ being a power function following the $$f(\Delta) = \left(\frac{\Delta}{\beta}\right)^\alpha \cdot \beta$$

In the next step 105, the processor will then calculate, for each one of the axes X,Y,Z, the difference $\Delta_t$ between said corrected second measurement $P'_{t-1}$ and said third measurement $P_t$, according to the equation:

$$\Delta_t = \|(P_t - P'_{t-1})\|$$

In a step 106, this difference $\Delta_t$ is then compared to the same predetermined threshold $\beta$ for each corresponding axis by the processor. If the difference $\Delta_t$ is higher or equal than the threshold $\beta$, the first measurement is left unfiltered. If the difference $\Delta_t$ is below said threshold $\beta$, the processor will calculate, in step 107, a corrected value $P'_t$ of the third measurement $P_t$ to replace said third measurement $P_t$ in a computer memory. This corrected value $P'_t$ is calculated according to the equation:

$$P'_t = P'_{t-1} + \Delta'_t\left(\frac{P_t - P'_{t-1}}{\Delta_t}\right)$$

wherein $\Delta'_t$ is corrected difference resulting from applying filtering function $f(\Delta)$ to the difference $\Delta_t$. However, before said step 107, in a step 108 the processor checks whether the previous measurement, that is, the second measurement $P_{t-1}$, was also corrected (that is, whether step 104 was carried out). In that case, the filtering strength $\alpha$ in the filtering function $f(\Delta)$ will be decreased by multiplying it in step 109 by an attenuating factor $\sigma$, wherein $0 < \sigma < 1$, before calculating $\Delta'_t$ and $P'_t$, so that $\alpha_t = \sigma \cdot \alpha_{t-1}$.

Although, when a decrease in filtering strength is desired, $\sigma < 1$, it is also possible to alternatively set $\sigma$ equal to 1 in those circumstances in which an increase in filtering strength is not desired.

For subsequent measurements, if the difference to each previous measurement is each time below the threshold $\beta$, the filtering strength may be multiplied each time again by the attenuating factor $\sigma$, so that the corrected measurements P' will converge towards the actual measurements P. If in a subsequent measurement the measured difference is equal or above threshold $\beta$, the filtering strength $\alpha$ will be reset at its original value.

Figure 3:
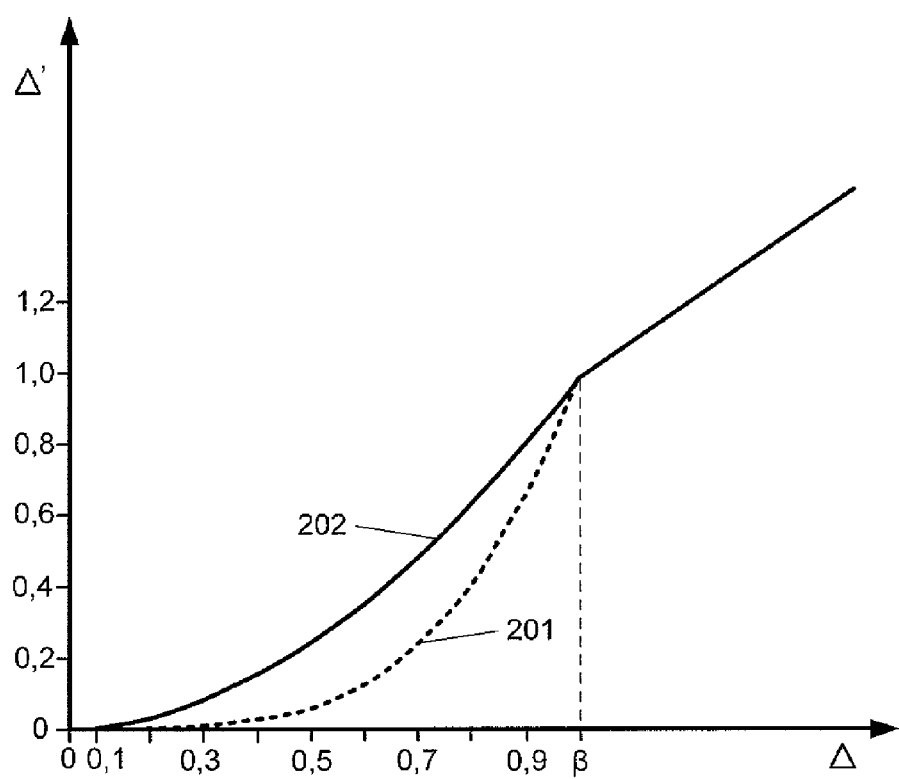
FIG. 3 shows a graph representing the effect of the stabilisation method according to the invention on several different differences with respect to an initial measurement.

In FIG. 3, the filtered differences $\Delta'_{t-1}$ and $\Delta'_t$ are plotted as function of measured difference $\Delta$ for an initial filtering strength $\alpha_{t-1}$ of 4 and an attenuating factor $\sigma$ of ½. Graph 201 corresponds to $\Delta'_{t-1}$ and graph 202 to $\Delta'_t$. As can be seen, in both cases there is no filtering above the threshold $\beta$. However, below said threshold, $\Delta'_{t-1}$ is filtered more strongly than $\Delta'_t$.

While in the preferred embodiment disclosed above the differences have been calculated, compared and filtered individually for each one of the axes X,Y, and Z, in an alternative embodiment the modulus of the vectorial distance between successive measurements could be used instead, using the same equations.

While in the preferred embodiment disclosed above the digital sensor is a 3D imaging sensor, and the physical variable measured is the position of a hand 1 in a three-dimensional reference frame, the methods and devices of the invention may be applied for various other types of physical variables, such as position, speed, acceleration, temperature, pressure, etc., captured through other types of digital sensors.

The present invention can be used alone or in combination with other user interfaces suitable for communication with a computer system 4, such as: switch, keyboard, mouse, trackball, tablet, touchpad, touchscreen, 6-DOF peripheral, joystick, gamepad, motion tracking system, eye tracking device, dataglove, 3D mouse, voice recognition, bioelectric sensor, neuronal interface, treadmill, static bicycle, rowing machine, or any other sensor or interface suitable for providing input to a computer system 4.

Among the commands and inputs that may be provided through the devices and methods of the present invention, there are:
- 2D and/or 3D navigation, such as point of view rotation, translation, positioning and/or orientation, as well as other vision parameters, such as perspective, range, colour, exposition, etc.
- Interface element navigation, comprising e.g. navigations within menus, lists, parameter choices, and/or input fields.
- Manipulation, comprising e.g. avatar control, control of application object parameters, such as position, orientation, translation; rotation, appearance, shape and/or function and/or control of system parameters.
- Triggering, such as validation of e.g. action commands, parameter change commands and/or change of state commands, action commands and/or commands to change the state of an application object, a control parameter and/or other.
- Selection of e.g. interface elements, application objects, real environment objects, etc.
- Force input, for instance in physical simulations.
- Output parameter adjustment, for instance for sound volume, appearance of application objects, presentation of application objects.

The computer system 4 can in turn be connected to any of a variety of output devices, such as, for example:
- Computer output devices, such as a 2D or 3D display devices, loudspeakers, headphones, printers, haptic output devices, ventilators and/or background lighting.
- Virtual reality output devices, such as virtual reality goggles, portable display devices, multiple display devices such as Cave®, large display devices such as Reality Center®, stereoscopic screens, force return devices, 3D display devices, smoke machines, and/or sprinklers.
- Home automation devices, such as window shutter control devices, heating control devices and/or lighting control devices.
- Home entertainment devices, such as TVs and/or music systems.
- Portable devices, such as portable music and/or video players, positioning systems, personal digital assistants, portable computers and/or mobile telephones.
- Other devices connectable to a computer system 4, such as valves, treadmills, robotic devices, etc.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A method for stabilising a series of measurements of a physical variable captured by a digital sensor, said method comprises the steps of:

capturing, through said sensor, at least a first measurement, a second measurement, and a third measurement of said physical variable;

storing each measurement of said physical variable in a digital memory;

comparing, using a processor, said first and second measurements;

replacing, in said digital memory, said second measurement with a corrected second measurement if a difference between said first measurement and said second measurement is below a predetermined threshold, said corrected second measurement having a reduced difference with respect to said first measurement in accordance with a first filtering strength and being calculated in accordance with:

$$P'_{t-1} = P_{t-2} + \Delta'_{t-1}\left(\frac{P_{t-1} - P_{t-2}}{\Delta_{t-1}}\right)$$

wherein $P_{t-2}$ is the first measurement, $P_{t-1}$ is the second measurement, $P'_{t-1}$ is the filtered value of the second measurement, $\Delta_{t-1}$ is the difference between said first and second measurements, and $\Delta'_{t-1}$ is the result of applying a filtering function $f(\Delta)$ to the difference $\Delta_{t-1}$ with the first filtering strength;

comparing, using the processor, said corrected second measurement and said third measurement; and replacing, in said digital memory, said third measurement with a corrected third measurement if a difference between said corrected second measurement and said third measurement is also below said threshold, said corrected third measurement having a reduced difference with respect to said corrected second measurement in accordance with a second filtering strength which is lower than the first filtering strength, said corrected third measurement being calculated in accordance with:

$$P'_t = P'_{t-1} + \Delta'_t\left(\frac{P_t - P'_{t-1}}{\Delta_t}\right)$$

wherein $P_t$ is the third measurement, $P'_{t-1}$ is the filtered value of the third measurement, $\Delta_t$ is the difference between said second and third measurements, and $\Delta'_t$ is the result of applying the filtering function $f(\Delta)$ to the difference $\Delta_{t-1}$ with the second filtering strength.

2. Method according to claim 1, wherein the filtering function f(Δ) is a power function following the equation:

$$f(\Delta) = \left(\frac{\Delta}{\beta}\right)^{\alpha} \cdot \beta$$

wherein α is the filtering strength and β is a threshold.

3. Method according to claim 1, wherein said first, second, and third measurements are successive in time.

4. Method according to claim 1, wherein said physical variable is a physical position.

5. Method according to claim 4, wherein said position is a position in a three-dimensional space.

6. Method according to claim 5, wherein a different set of filtering parameters is applied to each axis in three-dimensional space.

7. Method according to claim 4, wherein capturing each measurement of said physical position comprises recognising a given object in an image and measuring its position in a reference frame.

8. Method according to claim 1, wherein said digital sensor is an imaging sensor.

9. Method according to claim 8, wherein said digital sensor is a 3D imaging sensor (3).

10. Method for inputting data and/or commands to a computer system through a series of measurements of a physical variable captured by a digital sensor and stabilised using a method according to claim 1.

11. Method according to claim 10, wherein said data and/or commands relate to a computer game executed by said computer system.

12. Method according to claim 10, wherein said physical variable is a physical position of a body part of a user.

13. Computer system comprising:
   an input connectable to a digital sensor;
   a digital memory comprising instructions for executing a method for stabilising a series of measurements of a physical variable captured through said digital sensor according to claim 1; and
   a digital data processor connected to said digital memory and said input for executing said instructions.

14. A computer-readable data storage medium storing executable code for performing a method according to claim 1.

* * * * *